US 9,195,329 B2

(12) United States Patent
Lowles et al.

(10) Patent No.: US 9,195,329 B2
(45) Date of Patent: Nov. 24, 2015

(54) TOUCH-SENSITIVE DEVICE (75) Inventors: Robert Lowles, Waterloo (CA); James Alexander Robinson, Elmira (CA)

(73) Assignee: BlackBerry Limited, Waterloo, Ontario (CA)

( * ) Notice: Subject to any disclaimer, the term of this patent is extended or adjusted under 35 U.S.C. 154(b) by 1915 days.

(21) Appl. No.: 11/744,282

(22) Filed: May 4, 2007

(65) Prior Publication Data
US 2008/0273014 A1 Nov. 6, 2008

(51) Int. Cl.
G06F 3/041 (2006.01)
G06F 3/045 (2006.01)

(52) U.S. Cl.
CPC .............. *G06F 3/0412* (2013.01); *G06F 3/041* (2013.01); *G06F 3/045* (2013.01); *G06F 2203/04103* (2013.01); *G06F 2203/04113* (2013.01)

(58) Field of Classification Search
CPC ....... G06F 3/041; G06F 3/0412; G06F 3/045; G06F 2203/04103; G06F 2203/04113
USPC .................................. 345/156–184; 349/143
See application file for complete search history.

(56) References Cited

U.S. PATENT DOCUMENTS

| | | | |
|---|---|---|---|
| 4,202,041 A | 5/1980 | Kaplow et al. | |
| 4,731,694 A * | 3/1988 | Grabner et al. | 361/280 |
| 5,412,189 A | 5/1995 | Cragun | |
| 6,107,997 A | 8/2000 | Ure | |
| 6,198,475 B1 | 3/2001 | Kunimatsu et al. | |
| 6,236,386 B1 * | 5/2001 | Watanabe | 345/98 |
| 6,411,504 B2 * | 6/2002 | Howell et al. | 361/679.58 |
| 6,459,424 B1 * | 10/2002 | Resman | 345/173 |
| 6,492,978 B1 | 12/2002 | Selig et al. | |
| 7,199,322 B2 * | 4/2007 | Bourdelais et al. | 200/512 |

(Continued)

FOREIGN PATENT DOCUMENTS

| | | |
|---|---|---|
| CN | 1 955 904 A | 5/2007 |
| EP | 1717667 | 2/2006 |

(Continued)

OTHER PUBLICATIONS

European Patent Office, Summons to attend oral proceedings, issued in connection with European Patent Application Serial No. 07251889.7, on Apr. 8, 2010, 9 pages.
European Patent Office, EP Communication, issued in connection with European Patent Application Serial No. 07 251 889.7, on Feb. 3, 2009, 6 pages.
European Patent Office, EP Communication, issued in connection with European Patent Application Serial No. 07 251 889.7, on Sep. 27, 2007, 8 pages.

(Continued)

*Primary Examiner* — Kathy Wang-Hurst
*Assistant Examiner* — David Tung
(74) *Attorney, Agent, or Firm* — Fish & Richardson P.C.

(57) ABSTRACT

These needs, and others, are met by at least one embodiment of the disclosed invention which provides for a touch sensitive screen for an electronic device wherein there is a sparse pattern of sensors disposed within the active area and a dense pattern of sensors disposed within the viewing area. In this configuration, the pixels in the active area may have a larger aspect ratio and provide a more pleasing image while the dense sensors disposed within the viewing area provide more accurate touch sensitivity. Further, the software, or other electronics, used to create the image, may be structured to position menus or other selectable images adjacent to the viewing area. Similarly, certain images, such as icons, can be programmed to be displayed directly under the sensors in the active area. Generally, this configuration provides for the best of both worlds; a bright, clear image with some touch sensitivity in the active area and a sensitive sensor grid in the viewing area where there are no pixels.

26 Claims, 7 Drawing Sheets

(56) References Cited

U.S. PATENT DOCUMENTS

| | | | |
|---|---|---|---|
| 7,203,131 B2 * | 4/2007 | Watt | 367/111 |
| 2002/0156807 A1 | 10/2002 | Dieberger | |
| 2003/0081016 A1 | 5/2003 | Rahimzadeh et al. | |
| 2003/0235452 A1 | 12/2003 | Kraus et al. | |
| 2004/0056877 A1 | 3/2004 | Nakajima | |
| 2004/0090428 A1 | 5/2004 | Crandall, Jr. et al. | |
| 2005/0057528 A1 | 3/2005 | Kleen | |
| 2005/0179668 A1 * | 8/2005 | Edwards | 345/173 |
| 2007/0085838 A1 * | 4/2007 | Ricks et al. | 345/173 |
| 2007/0165006 A1 * | 7/2007 | Sato et al. | 345/174 |
| 2008/0273014 A1 | 11/2008 | Lowles et al. | |

FOREIGN PATENT DOCUMENTS

| | | |
|---|---|---|
| EP | 1 988 447 | 11/2008 |
| WO | 03025886 | 3/2003 |
| WO | 2006065252 | 6/2006 |

OTHER PUBLICATIONS

The State Intellectual Property Office of People's Republic of China, English language translation of the First Office Action in connection with Chinese Patent Application Serial No. 200810210323.8, issued on Jan. 22, 2010, 6 pages.

State Intellectual Property Office of People'S Republic of China, office action issued in CN application No. 200810210323.8, issued Apr. 20, 2011, 7 pages.

Canadian Intellectual Property Office, office action issued in CA patent application 2,630,397, dated Oct. 14, 2011, 6 pages.

Canadian Intellectual Property Office, Office Action issued in connection with Canadian Application No. 2,630,397, dated Dec. 19, 2013, 5 pages.

State Intellectual Property Office of People'S Republic of China, Third Office Action issued in CN Patent No. 200810210323.8, issued Mar. 7, 2012 6 pages. (English language translation pp. 1-2).

Canadian Intellectual Property Office, office action issued for CA application No. 2,630,397, dated Jan. 4, 2011, 4 pages.

* cited by examiner

TOUCH-SENSITIVE DEVICE

BACKGROUND

1. Field

This invention relates to electrical devices having a touch sensitive screen and, more specifically, to an electronic device having a touch sensitive screen wherein the touch detectors are disposed in a sparse pattern over the screen active area and in a dense pattern over the viewing area of the screen.

2. Description of the Related Art

As is well known in the art, users may interact with software or similar constructs through a display screen, or simply "screen." That is, the screen is structured to display images of various command and control functions which the user selects with an input device. For larger electronic devices, such as computers, the user typically utilizes a keyboard and/or mouse. For smaller electronic devices, such as, but not limited to, personal digital assistants or cellular telephones, control was originally limited to a keypad, as a mouse or similar device was not included. Similarly, electronic devices used in public areas, such as, but not limited to, automatic teller machines, also used simple keypads and did not include input devices such as a mouse or a full keyboard.

Figure 1:
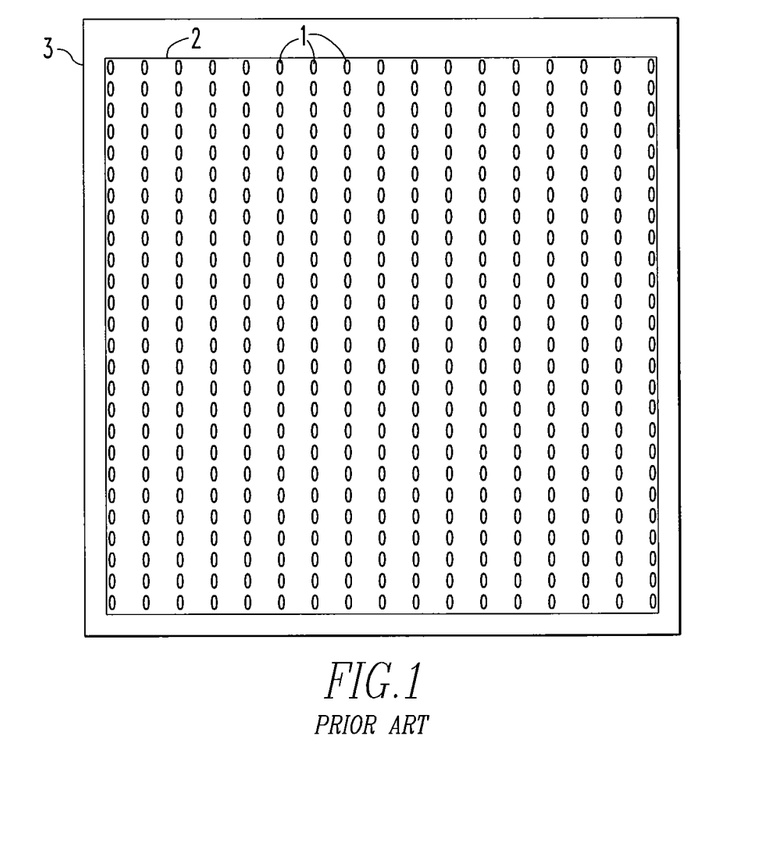
FIG. 1 is a schematic view of a prior art touch sensitive screen having sensors disposed in a constant pattern.

Users, however, desired the simplicity and ease of use associated with mouse or similar input devices. Thus, one improvement over a simple keypad was the use of a touch sensitive screen. One type of touch sensitive screen included sensors in a transparent layer above the screen. This type of device, however, increased the thickness of the screen and reduced the screen's optical performance. "In-glass" touch sensitive screens, however, typically included a plurality of sensors 1 disposed within the screen 2 as shown in FIG. 1. It is noted that the sensors are shown schematically and are typically not visible to the naked eye. The sensors, which were typically capacitive, mechanical, or optical sensors, provided a signal when actuated. The sensors are actuated when an object, typically a stylus or a finger, is positioned on, or immediately adjacent to, the screen. The sensors are coupled to a sensor output device which is further coupled to a control assembly. The sensor output device and/or control assembly are structured to interpret the sensor signals to determine the position on the screen over which the object is located. Thus, for example, an electronic device could display an image representing commands, such as icons or a menu, and a user could use a stylus or a finger to select the command simply by touching the portion of the screen displaying the icon of menu. Further, the sensors could also, typically, detect a "tap" which indicated when a selection had been made.

A screen 2, such as, but not limited to, a liquid crystal display (LCD) panel 3, is typically disposed in a frame or housing. The LCD panel utilizes a liquid crystal medium to produce an image formed from a number of small, illuminated points, or pixels, located on a grid. The pixels are spaced as closely together as possible so that the image does not include voids or dark areas. Further, the pixels have an "aspect ratio" that represents the size of the pixel. The screen or LCD panel has an active area that is structured to display images. Disposed about the active area is an inactive area. There are no pixels in the inactive area. Because it is desirable to not have the image abut the frame, a portion of the inactive area is visible to the user. This area is also called the "viewing area." Beneath the frame is a hidden portion of the inactive area that the user cannot see or touch.

As shown in FIG. 1, the sensors were typically disposed in a generally constant pattern over the entire active area and viewing area. This pattern is, typically, a dense pattern as the higher the number of sensors, the more accurate the touch sensitivity of the screen. That is, if the sensors were disposed in a sparse pattern, the accuracy of the sensor grid would be reduced and, for example, the controlling software may not be able to accurately identify which icon of menu item the user selected. The use of a dense pattern, however, is a disadvantage as the sensors required space in the active area and, to provide that space, the pixels had to have a reduced aspect ratio. This is a further disadvantage as the software, or other electronics, used to create the image can be structured to limit the locations of the menus or icon to specific portions of the active area, such as an area adjacent to the viewing area.

There is, therefore, a need for a touch sensitive screen for an electronic device that has a reduced number of sensors in the active area.

There is a further need for a touch sensitive screen for an electronic device that has a sparse pattern of sensors in the active area and a dense pattern of sensors in the viewing area.

SUMMARY OF THE INVENTION

These needs, and others, are met by at least one embodiment of the disclosed invention which provides for a touch sensitive screen for an electronic device wherein there is a sparse pattern of sensors disposed within the active area and a dense pattern of sensors disposed within the viewing area. In this configuration, the pixels in the active area may have a larger aspect ratio and provide a more pleasing image while the dense sensors disposed within the viewing area provide more accurate touch sensitivity. Further, the software, or other electronics, used to create the image, may be structured to position menus or other selectable images adjacent to the viewing area. Similarly, certain images, such as icons, can be programmed to be displayed directly under the sensors in the active area. Generally, this configuration provides for the best of both worlds; a bright, clear image with some touch sensitivity in the active area and a sensitive sensor grid in the viewing area where there are no pixels. Further, in use, the user's finger or stylus is disposed generally to the side of the menu as opposed to blocking the menu from view.

BRIEF DESCRIPTION OF THE DRAWINGS

Similar numerals refer to similar parts throughout the specification.

DESCRIPTION

As used herein, "touch sensitive" means structured to detect contact or near contact.

As used herein, "coupled" means a link between two or more elements, whether direct or indirect, so long as a link occurs.

As used herein, "directly coupled" means that two elements are directly in contact with each other.

As used herein, an "aspect ratio" it the ratio of a pixel's height divided by the pixel's width.

Figure 2:
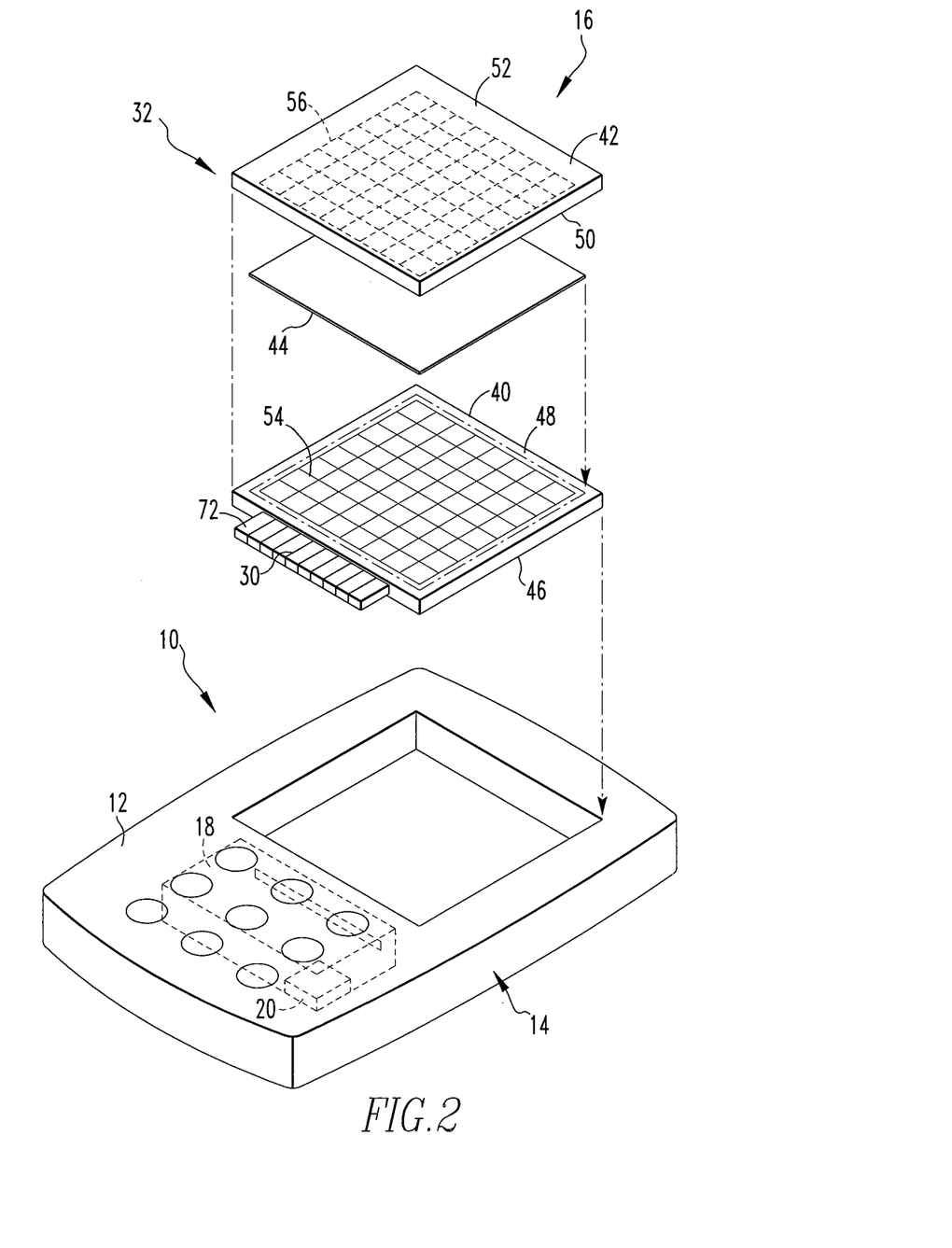
FIG. 2 is a schematic, exploded view of an electronic device.
Figure 3:
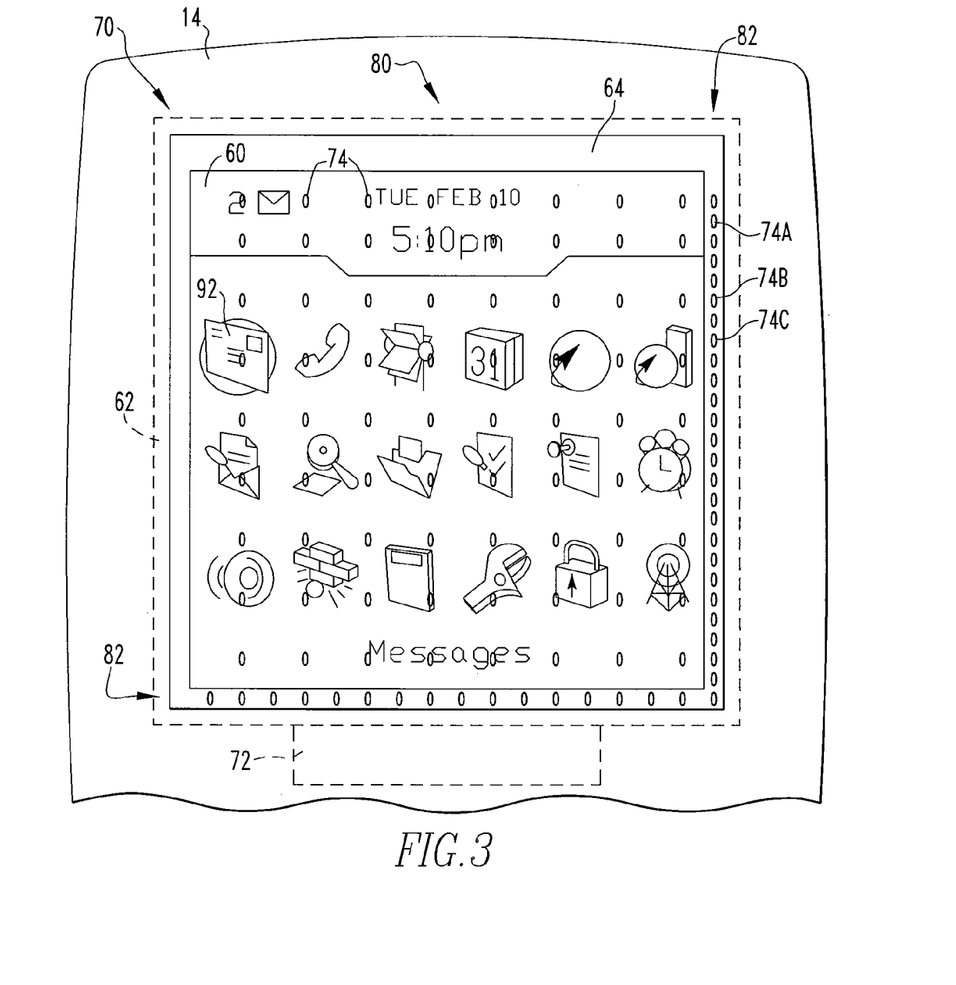
FIG. 3 is a schematic view of a touch sensitive screen having sensors disposed in a sparse pattern in the active area and in a dense pattern in the viewing area.

As shown in FIG. 2, an electronic device 10, herein represented by a handheld personal digital assistant, includes a housing 12, a control assembly 14, and a display assembly 16. As is known, the control assembly 14 includes a processor 18, memory 20, as well as other components, such as, but not limited to, a circuit board (not shown), structured to link the processor 18, memory 20, and display assembly 16. The control assembly 14 further includes a set of instructions, such as, but not limited to, software, structured to perform various functions including creating images on the display assembly 16 and receiving input from the user. Thus, the control assembly 14 is structured to provide a video input to the display assembly 16 input/output assembly 30 (described below) and to receive sensor output from a sensor assembly 70 (FIG. 3.).

The display assembly 16 includes an input/output assembly 30 and an LCD panel 32. The display assembly input/output assembly 30 is structured to receive a video input from the control assembly 14 and to produce an image on the LCD panel 32. The LCD panel 32 includes a lower substrate 40 and an upper substrate 42 disposed in a close, but spaced, relationship. The LCD panel 32 also includes a liquid crystal layer 44 disposed between the lower and upper substrates 40, 42. Upon application of an electrical charge, the liquid crystal molecules of the liquid crystal layer 44 are structured to align in a generally perpendicular direction with respect to the substrates 40, 42. The lower substrate 40 has a lower, outer surface 46 and an upper, inner surface 48. The upper substrate 42 has a lower, inner surface 50 and an upper, outer surface 52. The lower substrate upper, inner surface 48 has a first electrode 54, also called the pixel electrode, applied thereto. The upper substrate lower, inner surface 50 has a second electrode 56, also called the common electrode, applied thereto.

The first and second electrodes 54, 56 form a grid that defines the aperture size of the pixels. The display assembly input/output assembly 30 selectively controls the location of the charge applied to the first electrode 54 thereby forming images on the LCD panel 32. Typically, the display assembly input/output assembly 30 includes a programmable logic circuit, or integrated circuit, structured to apply a charge to the proper pixels.

The LCD panel 32 only creates an image in the area defined by the overlap of the first and second electrodes 54, 56. The LCD panel 32 has a greater area than the first and second electrodes 54, 56, however. As shown in FIG. 3, the area wherein an image is created is the active area 60 of the LCD panel 32. Immediately adjacent to, and surrounding, the active area 60 is an inactive area 62 wherein there are no pixels and no image is created. This area is called the viewing area 64. Typically, the perimeter of the inactive area 62 is disposed below the electronic device housing 12 and cannot be seen or touched by the user during normal operation.

The electronic device 10 (FIG. 2) also includes a sensor assembly 70 (FIG. 3) having an output device 72 and a plurality of detectors 74. As noted above, the detectors 74 are shown schematically and are typically too small to be seen by the naked eye. Each detector 74 is in electrical communication with the output device 72. Each detector 74 creates an output signal when actuated. The detectors 74 are disposed in a pattern, discussed below, and are structured to detect an external object immediately adjacent to, or touching, the LCD panel 32. The external object is typically a stylus or the user's finger (not shown). The output device 72 and/or the control assembly 14 are structured to receive the detector signals and convert the signals to data representing the location of the external object relative to the LCD panel 32. The detectors 74 are typically capacitive detectors 74A, optical detectors 74B, or mechanical detectors 74C. Typically, capacitive detectors 74A are structured to detect a change in capacitance caused by the electrical field of the external object or a change in capacitance caused by the compression of the capacitive detector 74A. Optical detectors 74B are structured to detect a reflection of light, e.g., light created by the LCD panel 32. Mechanical detectors 74C include a charged grid with columns disposed on one side of the LCD panel 32 and a corresponding grid without columns on the opposing side of the LCD panel 32. When the LCD panel 32 is compressed, i.e. as a result of being touched by the user, the columns at the area of compression contact the opposing grid thereby completing a circuit. Capacitive detectors 74A may be disposed upon the lower substrate upper, inner surface 48 or upon the upper substrate upper, outer surface 52. The detectors 74, although small, require space and any pixel adjacent to a detector 74 will have a reduced size, or aperture, to accommodate the adjacent detector 74.

The detectors 74 are disposed in a pattern, preferably in lines wherein multiple lines form a grid. The pattern has at least a first portion 80 and a second portion 82. Detectors 74 in the first portion 80 are disposed over the active area 60. Because the active area 60 also includes the pixels that form the image, the detectors 74 in the first portion 80 are disposed in a sparse pattern so that fewer pixels will have a reduced aspect ratio. Preferably, the spacing of detectors 74 in the first portion 80 is between about 1.0 mm and 10.0 mm between the detectors 74, and more preferably about 3.0 mm between the detectors 74. Conversely, detectors 74 in the second portion 82 are disposed over the viewing area 64. Because the image is not created in the viewing area 64, and therefore there are no pixels to be adversely affected, the detectors 74 in the second portion 82 are disposed in a dense pattern. Preferably, the density of detectors 74 in the second portion 82 is between about 0.5 mm and 6.0 mm between the detectors, and more preferably about 1.0 mm between the detectors.

Figure 4:
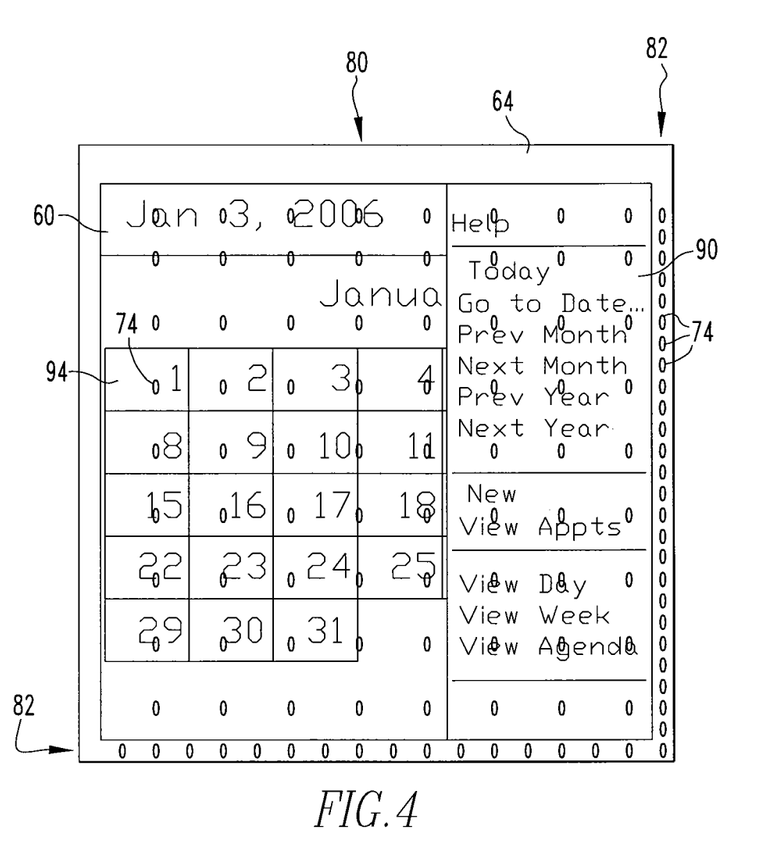
FIG. 4 is a schematic view of a touch sensitive screen having sensors disposed in a sparse pattern in the active area and in a dense pattern in the viewing area, and further showing how the displayed image corresponds to the placement of the sensors.

The control assembly 14 is structured to create the image and define the boundaries of selectable portions of the image on the active area 60 of the LCD panel 32. For example, and as shown in FIG. 4, the control assembly 14 will, for example, create the image of a pull-down menu 90 or a selectable icon 92 (FIG. 3) on specific portions of the active area 60 of the LCD panel 32. The control assembly 14 is further structured to relate specific detectors 74 to the specific portions of the active area 60 of the LCD panel 32. Thus, when the control assembly 14 detects the actuation of a specific detector 74 adjacent to a specific image, e.g. an icon 92, the control assembly 14 will perform the command related to that icon 92, e.g. opening the calendar program.

As shown in FIGS. 3 and 4, in one embodiment the detectors 74 in the first portion 80 are disposed in a loose grid and detectors 74 in the second portion 82 are disposed in a dense line extending adjacent to the right-hand side and the bottom side of the active area 60. When the detectors 74 are disposed in this pattern, the control assembly 14 is, preferably, structured to create interactive images having multiple selections, such as, but not limited to, pull-down menus 90 along the right side of the active area 60. Conversely, other interactive images, such as, but not limited to, icons 92 or, as shown, selectable dates 94 on a calendar (FIG. 4), are created in the first portion 80 and are created so that each interactive image is located adjacent to a limited number of detectors 74. In this configuration a user may, for example, select a date by touching the desired date. As there is, preferably, only one detector 74 within the image of the date, the output device 72 and/or the control assembly 14 will be able to identify which date is being selected. The user may then, for example, open a pull down menu 90. As the pull-down menu 90 has multiple selections, i.e. menu items, located very close to each other, the user moves the external object along the right side of the active area 60 wherein the detectors 74 in the second portion 82 are disposed in a dense pattern. Because the detectors 74 in the second portion 82 are disposed in a dense pattern, the control assembly 14 will be able to more accurately identify which of the closely disposed menu items is being selected.

Figure 5:
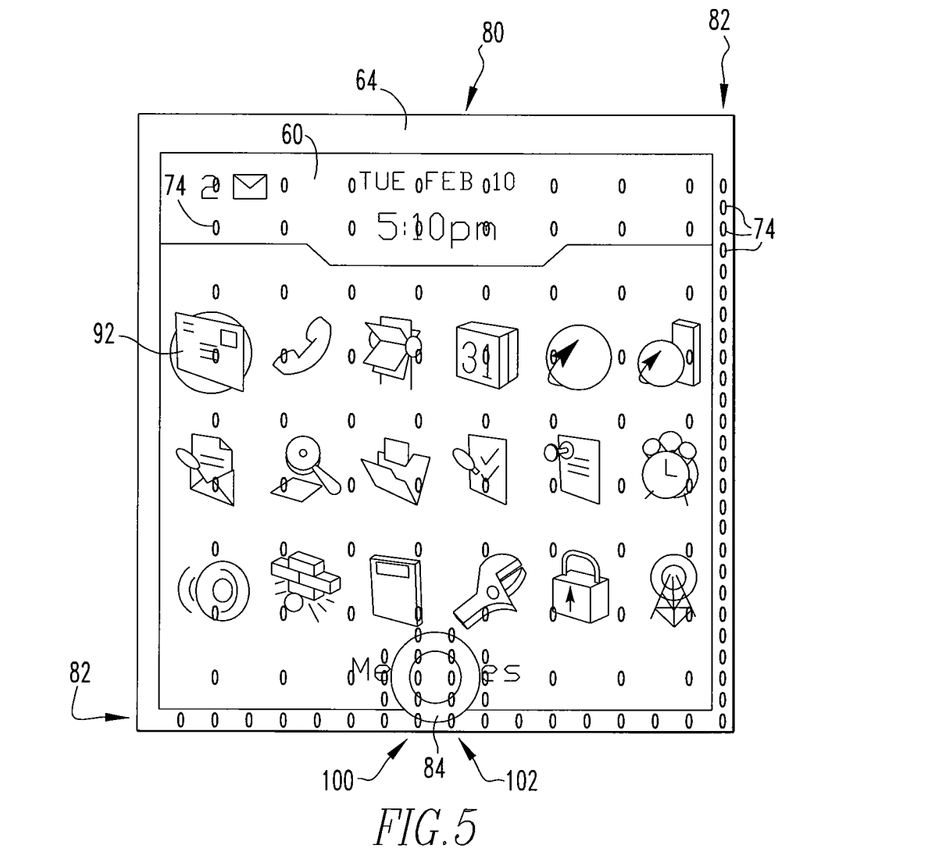
FIG. 5 is a schematic view of a touch sensitive screen having sensors generally disposed in a sparse pattern in the active area, in a dense pattern in the viewing area, and having a limited area of dense sensors in the active area.

As shown in FIG. 5, in another embodiment the pattern of detectors 74 has a first portion 80, a second portion 82, and a third portion 84. The first portion 80 and second portion 82 are substantially similar to the embodiment described above. The third portion 84 is an area of detectors 74 disposed in a dense pattern and located within the active area 60. In this configuration, the third portion 84 is structured to support a virtual control device 100, such as a virtual roller wheel 102 or similar device. The image quality in the third portion 84 is adversely affected for the reasons set forth above. However, the third portion 84 is, preferably, a relatively small area compared to the entire active area 60. Preferably, the density of detectors 74 in the third portion 84 is between about 0.05 mm and 3.0 mm between the detectors, and more preferably about 0.1 mm between the detectors. Further, because the third portion 84 is a dedicated area for the virtual roller wheel 102, it is acceptable to have a reduced pixel density with larger pixels. Since the pixel size would be very large, the aspect ratio could be significantly higher, e.g., about 65 to 98. These pixels would be special function pixels, such as pixels to light up the roller wheel 102 area and other features to highlight the roller wheel 102.

Figure 6:
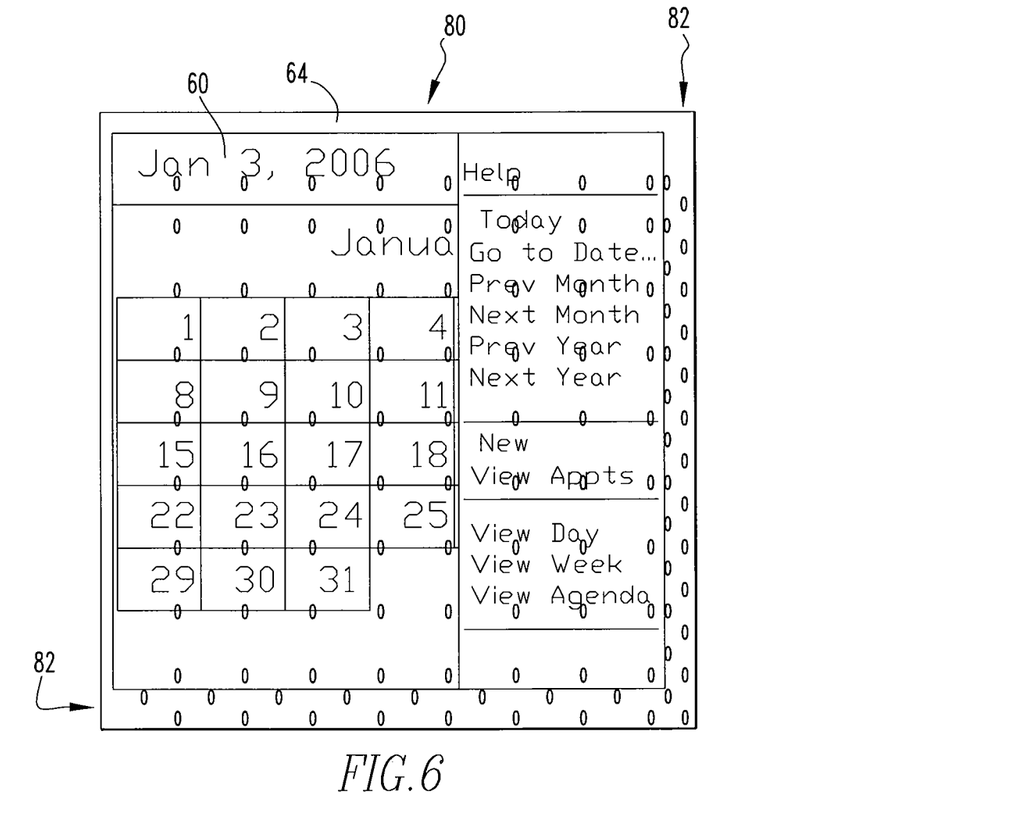
FIG. 6 is a schematic view of a touch sensitive screen having sensors disposed in a sparse pattern in the active area and in an alternate dense pattern in the viewing area.
Figure 7:
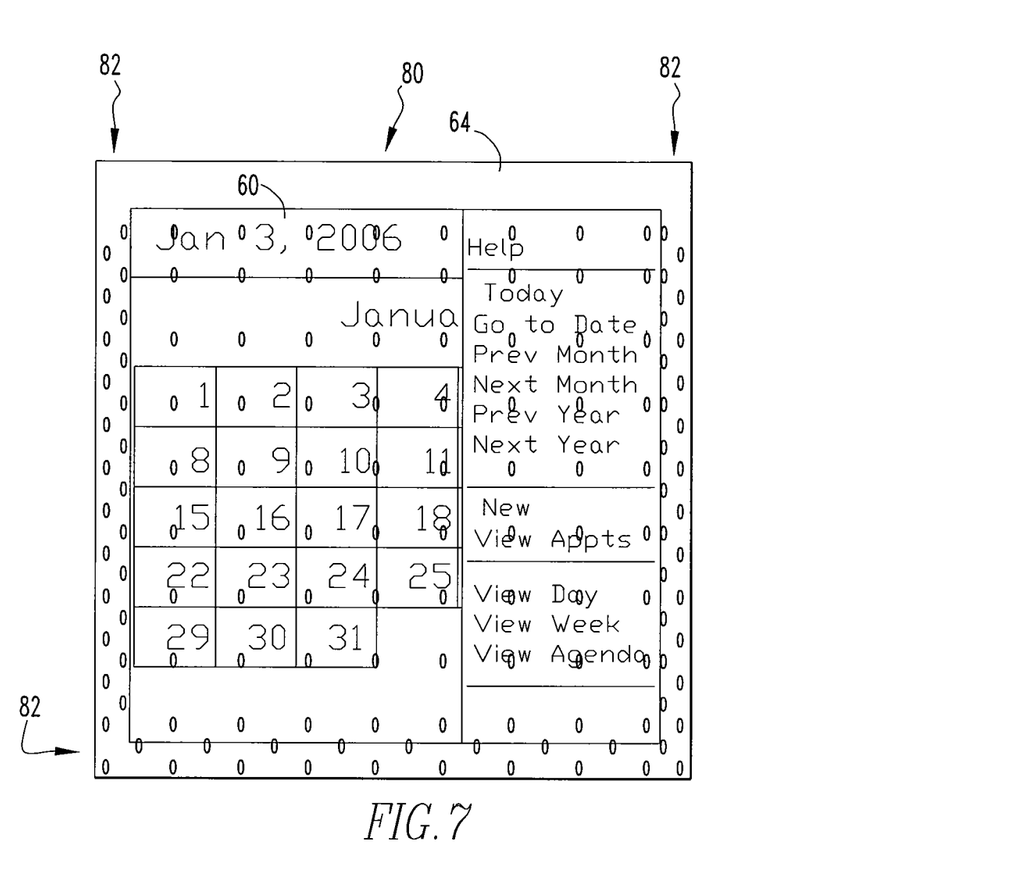
FIG. 7 is a schematic view of a touch sensitive screen having sensors disposed in a sparse pattern in the active area and in an alternate dense pattern in the viewing area.

As shown in FIGS. 3-5, the detectors 74 in the second portion 82 are shown as being in a single straight line. The invention, however, is not so limited. For example, as shown in FIG. 6, the detectors 74 in the second portion 82 may be disposed in a dense but alternating pattern having two generally parallel lines of detectors 74. Further, as described above and as shown in FIGS. 3-5, the detectors 74 in the second portion 82 are disposed in a dense line extending adjacent to the right-hand side and the bottom side of the active area 60. Again, the invention is not so limited and, as shown in FIG. 7, the detectors 74 may be disposed on any portion of the viewing area 64 such as, but not limited to, along the left-hand side for use with interactive images that are displayed along the left side of the active area 60. Further, sensors 74 may be disposed along both the left-hand side and the right-hand side so that the user may use either hand, or both hands, to operate the electronic device 10.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A touch-sensitive device comprising:
    a display having a display panel, wherein an image is displayed in an active area of the display panel, and no image can be displayed in an inactive area of the display panel;
    a plurality of detectors comprising a first plurality of detectors and a second plurality of detectors structured to detect a touch on the display panel and to provide an output signal related to a position of the touch;
    wherein the first plurality of detectors has a first dispersion density and is disposed over at least part of the active area;
    wherein the second plurality of detectors has a second dispersion density greater than the first dispersion density and is disposed over at least part of the inactive area.

2. The touch-sensitive device of claim 1, wherein the spacing of the first plurality of detectors is between about 1.0 mm and 10.0 mm and the spacing of the second plurality of detectors is between about between about 0.5 mm and 6.0 mm.

3. The touch-sensitive device of claim 1, wherein the spacing of the first plurality of detectors is about 3.0 mm and the spacing of the second plurality of detectors is about 1.0 mm.

4. The touch-sensitive device of claim 1, wherein each of the plurality of detectors is a capacitive detector structured to sense a change in capacitance.

5. The touch-sensitive device of claim 1, wherein:
    the panel includes a lower substrate, a first electrode, a liquid crystal layer, a second electrode, and an upper substrate; the lower substrate has a lower, outer surface and an upper, inner surface;
    the first electrode is disposed on the lower substrate upper, inner surface; the upper substrate has a lower, inner surface and an upper, outer surface;
    the second electrode is disposed on the upper substrate lower, inner surface; the lower substrate and the upper substrate are disposed in a close, but spaced, relationship;
    the liquid crystal layer is disposed between the lower substrate and the upper substrate.

6. The touch-sensitive device of claim 5, wherein the plurality of detectors is disposed on the upper substrate upper, outer surface.

7. The touch-sensitive device of claim 5, wherein the plurality of detectors is disposed on the lower substrate upper, inner surface.

8. The touch-sensitive device of claim 5, wherein the plurality of detectors is disposed on the upper substrate lower, inner surface.

9. The touch-sensitive device of claim 1, wherein each of the plurality of detectors is an optical detector structured to detect a reflection of light.

10. The touch-sensitive device of claim 1, wherein:
    the panel includes a first electrode, a liquid crystal layer, and a second electrode;
    the second electrode has an aperture pattern such that, when the first electrode and the second electrode are selectively charged, an image is displayed on the liquid crystal layer in the active area.

11. The touch-sensitive device of claim 1, wherein the plurality of detectors further comprises a third plurality of detectors densely dispersed and disposed at least partially over the active area, wherein the third plurality of detectors is more densely dispersed than the first plurality of detectors.

12. The touch-sensitive device of claim 11, wherein:
the spacing of the first plurality of detectors is between about 1.0 mm and 10.0 mm; the spacing of the second plurality of detectors is between about between about 0.5 mm and 6.0 mm;
the spacing of the third plurality of detectors is between about between about 0.05 mm and 3.0 mm; the spacing of the first plurality of detectors is greater than the spacing of the second plurality of detectors; and
the spacing of the second plurality of detectors is greater than the spacing of the third plurality of detectors.

13. The touch-sensitive device of claim 11, wherein the spacing of the first plurality of detectors is about 3.0 mm; the spacing of the second plurality of detectors is about 1.0 mm; and the spacing of the third plurality of detectors is about 0.1 mm.

14. The touch-sensitive device of claim 11, wherein:
the panel includes a first electrode, a liquid crystal layer, and a second electrode;
the second electrode has an aperture pattern such that, when the first electrode and the second electrode are selectively charged, an image is displayed the liquid crystal layer in the active area.

15. The touch-sensitive device of claim 1, wherein the output signal is provided to a control assembly and includes data indicating a position of an object relative at least one of the active area and the inactive area.

16. The touch-sensitive device of claim 1, wherein the second plurality of detectors is arranged in a substantially single line, or wherein the second plurality of detectors is arranged in a plurality of substantially parallel lines.

17. The touch-sensitive device of claim 1, wherein the active area is co-planar with the inactive area.

18. The touch-sensitive device of claim 1, wherein the second plurality of detectors is disposed only over the inactive area.

19. The touch-sensitive device of claim 1, wherein the first plurality of detectors is disposed only over the active area.

20. A touch-sensitive device comprising:
a display having a display panel, wherein an image is displayed in an active area of the display panel, and no image is displayed in an inactive area of the display panel, and wherein the inactive area comprises no pixels;
a plurality of detectors comprising a first plurality of detectors and a second plurality of detectors structured to detect a touch on the display panel and to provide an output signal related to a position of the touch;
wherein the first plurality of detectors has a first dispersion density and is disposed over at least part of the active area;
wherein the second plurality of detectors has a second dispersion density greater than the first dispersion density and is disposed over at least part of the inactive area.

21. The touch-sensitive device of claim 20, wherein the active area is co-planar with the inactive area.

22. The touch-sensitive device of claim 20, wherein the second plurality of detectors is disposed only over the inactive area.

23. The touch-sensitive device of claim 20, wherein the first plurality of detectors is disposed only over the active area.

24. A touch-sensitive device comprising:
a display having a display panel comprising a plurality of electrodes defining an active area of the display panel and an inactive area of the display panel, wherein an image is displayed in the active area of the display panel, and no image is displayed in the inactive area of the panel;
a plurality of detectors comprising a first plurality of detectors and a second plurality of detectors structured to detect a touch on the display panel and to provide an output signal related to a position of the touch;
wherein the first plurality of detectors has a first dispersion density and is disposed over at least part of the active area;
wherein the second plurality of detectors has a second dispersion density greater than the first dispersion density and is disposed over at least part of the inactive area.

25. The touch-sensitive device of claim 24, wherein the second plurality of detectors is disposed only over the inactive area.

26. The touch-sensitive device of claim 24, wherein the first plurality of detectors is disposed only over the active area.

* * * * *